United States Patent
Singh et al.

(10) Patent No.: US 9,959,425 B2
(45) Date of Patent: May 1, 2018

(54) METHOD AND SYSTEM OF PRIVACY PROTECTION IN ANTAGONISTIC SOCIAL MILIEU/DARK PRIVACY SPOTS

(71) Applicant: Reliance Jio Infocomm Limited, Mumbai (IN)

(72) Inventors: Gulprit Singh, Bhopal (IN); Karan Sachan, Meerut (IN); Rajeev Gupta, Uttar Pradesh (IN)

(73) Assignee: RELIANCE JIO INFOCOMM LIMITED, Mumbai (IN)

( * ) Notice: Subject to any disclaimer, the term of this patent is extended or adjusted under 35 U.S.C. 154(b) by 0 days. days.

(21) Appl. No.: 14/981,849

(22) Filed: Dec. 28, 2015

(65) Prior Publication Data

US 2016/0188904 A1    Jun. 30, 2016

(30) Foreign Application Priority Data

Dec. 31, 2014    (IN) .......................... 4254/MUM/2014

(51) Int. Cl.
*G06F 21/62* (2013.01)

(52) U.S. Cl.
CPC ................................ *G06F 21/6245* (2013.01)

(58) Field of Classification Search
CPC .... G06F 21/6245; G06F 21/57; G06F 21/577; G06F 21/88; G06F 21/62; G06F 2221/2111
See application file for complete search history.

(56) References Cited

U.S. PATENT DOCUMENTS

| | | | | |
|---|---|---|---|---|
| 8,311,513 B1* | 11/2012 | Nasserbakht | ........ | G06Q 10/109 455/410 |
| 8,604,906 B1* | 12/2013 | Halferty | .................. | G05B 1/01 340/5.83 |
| 9,104,886 B1* | 8/2015 | Dolbakian | .............. | G06F 21/62 |
| 9,363,361 B2* | 6/2016 | Kimchi | ............. | H04M 1/72569 |
| 2007/0063816 A1* | 3/2007 | Murakami | ........... | A61B 5/1171 340/5.82 |
| 2008/0215509 A1* | 9/2008 | Charlton | ............... | G06F 21/604 706/11 |
| 2009/0253410 A1* | 10/2009 | Fitzgerald | ............... | G06F 21/88 455/411 |
| 2010/0138297 A1* | 6/2010 | Fitzgerald | ............... | G06F 21/88 705/14.53 |
| 2011/0154244 A1* | 6/2011 | Howell | ............... | G06F 21/6245 715/772 |
| 2012/0028659 A1* | 2/2012 | Whitney | ........... | H04M 1/72547 455/466 |
| 2013/0004090 A1* | 1/2013 | Kundu | .................. | G07F 19/207 382/232 |

(Continued)

Primary Examiner — Nelson Giddins
(74) Attorney, Agent, or Firm — Ladas & Parry, LLP

(57) ABSTRACT

An efficient and robust system 100 of privacy protection to provide security of a computing device by identifying and detecting unauthorized intrusion/peek problems related to computing device's environment/surrounding is disclosed. The system 100 includes a detector unit 102 for detecting data related to environment/surrounding of the computing device; a processing unit 104 for processing the detected data and a recommendation unit 106 to notify the user about the threat posed by environment/surrounding. The present disclosure enables device owner to access his device more freely in vulnerable surroundings.

9 Claims, 2 Drawing Sheets

(56) References Cited

U.S. PATENT DOCUMENTS

| | | | |
|---|---|---|---|
| 2014/0019427 A1* | 1/2014 | Wan | G06F 17/30312 |
| | | | 707/694 |
| 2014/0122396 A1* | 5/2014 | Swaminathan | G06N 5/02 |
| | | | 706/14 |
| 2015/0163242 A1* | 6/2015 | Laidlaw | G06F 21/552 |
| | | | 726/22 |
| 2015/0324698 A1* | 11/2015 | Karaoguz | G06F 19/3437 |
| | | | 706/46 |
| 2015/0370228 A1* | 12/2015 | Kohn | G06Q 50/06 |
| | | | 700/31 |
| 2016/0006749 A1* | 1/2016 | Cohen | G06Q 40/12 |
| | | | 726/23 |
| 2016/0029224 A1* | 1/2016 | Edge | G01S 5/0252 |
| | | | 455/456.1 |
| 2016/0034697 A1* | 2/2016 | Mebed | G06F 21/00 |
| | | | 726/28 |
| 2016/0188145 A1* | 6/2016 | Vida | G06F 9/4443 |
| | | | 715/745 |
| 2016/0283698 A1* | 9/2016 | Huang | G06F 21/32 |
| 2016/0300074 A1* | 10/2016 | Huang | G06F 21/575 |
| 2017/0099200 A1* | 4/2017 | Ellenbogen | H04L 43/04 |
| 2017/0142076 A1* | 5/2017 | Ford | H04L 63/0428 |
| 2018/0040044 A1* | 2/2018 | Mattingly | G06Q 30/0617 |

\* cited by examiner

METHOD AND SYSTEM OF PRIVACY PROTECTION IN ANTAGONISTIC SOCIAL MILIEU/DARK PRIVACY SPOTS

CROSS-REFERENCE TO RELATED APPLICATIONS

This application claims the benefit of and priority to Indian Patent Application No. 4254/MUM/2014 filed on Dec. 31, 2014, the disclosure of which is hereby incorporated in its entirety by reference.

TECHNICAL FIELD

The present disclosure generally relates to a system and method for context aware privacy protection and more particularly to detecting of unauthorized peek/access on a device and triggering a related notification to the user.

BACKGROUND OF DISCLOSURE

The following description of related art is intended to provide background information pertaining to the field of the present disclosure. This section may include certain aspects of the art that may be related to various aspects of the present disclosure. However, it should be appreciated that this section be used only to enhance the understanding of the reader with respect to the present disclosure, and not as admissions of prior art.

Presently, the range of using computing devices has been expanded from personal computing to ubiquitous computing as information industry and mobile communication technology has technologically advanced.

These computing devices usually contained a collection of sensitive information such as personal and professional emails, banking information, social media etc. Since these computing devices were generally exposed to open environment, therefore, they were quite vulnerable to threats such as snooping, peeking etc. that might compromise data privacy. For example, reading a bank statement in an environment which was heavily surveillance by CCTV camera.

Another reason behind the increased threat to these devices was that they were getting increasingly mobile. Unlike old fixed devices, which used to be situated at a fixed place, not much threat was exposed from environment as compared to present moving devices. For instance, in a public place, an intruder might peek into the sensitive information on the user's device. Another example would be reading a sensitive mail in a crowded elevator with somebody peeking secretly into the screen could lead to data compromise.

This lead to a greater need of security of these computing devices and more particularly to the security of interfaces of these devices to hinder the intruder peeking into the devices. There were many techniques and methods introduced for protecting the information stored in the computing device. One of the methods asked the user to enter the login ids or passwords for authentication. However, this did not help in detecting the intruder peeking into the device. Also, the existing system provided security only at phone level, and not at application level.

Furthermore, the existing techniques did not pay adequate attention to the threat posed by the surroundings i.e. there was no provision for detecting the presence of intruder peeking into the device which lead to compromising of private information of the user.

Hence, there is a need of a system and method to check for the threats posed by the intruders in environment and further minimise the risk of information breach in a computing device.

SUMMARY OF DISCLOSURE

In view of the shortcomings of existing privacy protection systems, as discussed in the background section, it is apparent that there exists a need for developing a more efficient context aware protection mechanism that not only overcomes the problems of the prior art but is also advantageously used to secure the data from the surrounding.

Accordingly, the present disclosure aims at providing a more robust and secured system and method for context aware privacy protection. More particularly, the disclosure encompasses capturing data from the environment/surrounding and notifying the user about vulnerability, if any, to their computing device/s. The system and method of the present disclosure also provides security at application layer (layer 7 of OSI model), meaning thereby that not only the device is protected, but all the content/data stored or present in the device is provided with security. This ensures dual protection mechanism for better security.

More particularly, the system and method of the present disclosure are oriented to provide an automated context aware privacy protection on the computing device that silently authenticates the user and takes security actions to counter the breach, in case the authentication fails. Accordingly, the present disclosure discloses a system and method for protecting the sensitive/private data information in an antagonist environment/surrounding by providing safe access to user sensitive information.

The system and method disclosed in the present disclosure employs a detector unit to detect environment/surrounding; a processing unit consisting of rules and decisions to generate a response according to current environment/surrounding and a recommendation unit to notify the user about the threat posed by environment/surrounding. Further, recommendation unit in the present system comprises of a storage unit for storing the surrounding information/data detected by the detector unit, a processing unit for processing said data to generate a request and an alert unit for notifying the user about threat or breach in security, if any. The disclosure also encompasses triggering a security action in response to the detected data, for example displaying an alert on the computing device, shutting down the computing device, hiding the contents displayed on the computing device, sending a notification and a combination thereof. The security action generated aims to protect the privacy of the computing device.

BRIEF DESCRIPTION OF DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure.

Some drawings may indicate the components using block diagrams and may not represent the internal circuitry of each component. It will be appreciated by those skilled in the art

Figure 1:
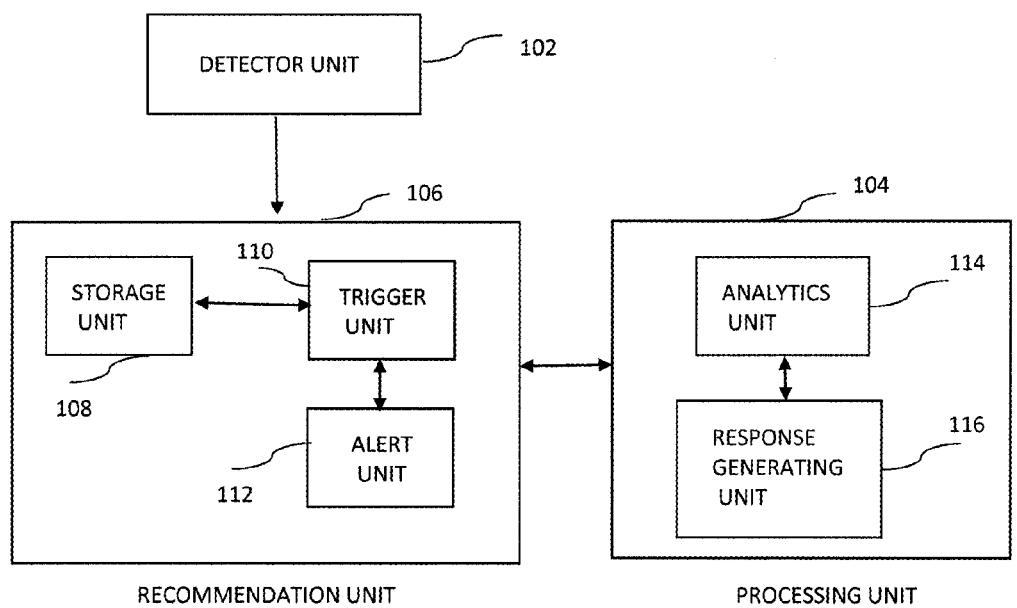
FIG. 1 illustrates a general overview of the system architecture for context aware privacy protection.

The foregoing will be apparent from the following more detailed description of example embodiments of the disclosure, as illustrated in the accompanying drawings.

DETAILED DESCRIPTION OF EXEMPLARY EMBODIMENTS

In the following description, for the purposes of explanation, various specific details are set forth in order to provide a thorough understanding of the disclosed embodiments. It will be apparent, however, that the disclosed embodiments may be practiced without these specific details.

Several features described hereafter can each be used independently of one another or with any combination of other features. However, any individual feature may not address any of the problems discussed above or might address only some of the problems discussed above. Some of the problems discussed above might not be fully addressed by any of the features described herein. Although headings are provided, information related to a particular heading, but not found in the section having that heading, may also be found elsewhere in the specification. Further, information provided under a particular heading may not necessarily be a part of only the section having that heading.

As used herein, a 'computing device' refers to any electrical, electronic, electromechanical or an equipment or a combination of one or more of the above devices. Computing devices may include, but not limit to, a mobile phone, smart phone, pager, laptop, a general purpose computer, desktop, personal digital assistant, tablet computer, mainframe computer, or any other computing device as may be obvious to a person skilled in the art. In general, a computing device is a digital, user configured, computer networked device that can operate autonomously. A computing device is one of the appropriate systems for storing data and other private/sensitive information. Said device operate at all the seven levels of ISO reference model but the primarily function is related to the application layer along with the network, session and presentation layer.

As used herein, a "storage unit" refers to any non-transitory media that stores data and/or instructions that cause a system to operate in a specific manner. The disclosed embodiments may further encompass a memory, wherein the memory is single or multiple, coupled or independent, is positioned at device level or server level and encompasses other variations and options of implementation as may be obvious to a person skilled in the art.

As used herein, a "detector unit" refers to any non-transitory media that detects data in environment/surrounding of a computing device. Detector unit may include, but not limit to, sensor, camera, microphone or any other devices obvious to a person skilled in the art. Furthermore, sensor may be but not limit to biometric sensor, distance proximity sensor to sense people near the computing device, etc.

As used herein, a "network"/"communication network" refers to any medium that connects one or more elements/modules/devices/units/server between the clients/users and server encompassed by the present disclosure. A network includes, but not limit to, personal area network, local area network, metropolitan area network, wide area network, Internet, or any combination thereof. A network may even be a storage area network, virtual private network, enterprise private network or a combination thereof.

As used herein, "connect", "configure", "couple" and its cognate terms, such as "connects", "connected", "configured" and "coupled" may include a physical connection (such as a wired/wireless connection), a logical connection (such as through logical gates of semiconducting device), other suitable connections, or a combination of such connections, as may be obvious to a skilled person.

As used herein, an "application" refers to any application software that is pre-installed, or downloaded and installed, in an electronic device. Applications include, but not limit to contact management application, calendar application, messaging applications, image and/or video modification and viewing applications, gaming applications, navigational applications, office applications, business applications, educational applications, health and fitness applications, medical applications, financial applications, social networking applications, and any other applications.

As used herein, "detected data" refers to data detected by the system in a computing device using the detector unit. Detected data may include but not limit to number of persons in the environment/surrounding of a computing device, any biometric attribute of a person such as his eyes, his hands, by which presence of the person may be determined, number of intruders peeking into computing device, presence of cctv cameras, distance of intruder from computing device, location of user, facial position of intruder, viewing position of a person with respect to the user and its computing device, body angle of intruder in which he is standing, movement of person, vulnerability of threat in an environment/surrounding or any other related information.

As used herein, "context based data" also refers to any data related to the environment/surrounding of a computing device, wherein the data is capable to provide information of the context of the surrounding or a situation or a circumstance. Said data may include but not limit to noise level, location of user etc. Context based data and detected data have been used interchangeably within the specification.

As used herein, "sensitive data" refers to any data or software stored or contained in a computing device. Sensitive data may include but not limit to text messages, text files, emails, photos, audio content, video content or any other personal content or information of the user stored or configured in the computing device.

As used herein, a "notification" is a wireless signal/function that conveys information. Said notification may include but not limit to information relating to threat such as, vulnerability of threat, number of persons near you, an indication that whether device is secured or not etc.

As used herein, a "response" is also a wireless signal/function that convey information. Response has been explained further in the detailed description of disclosure.

As used herein, "send", "transfer", "transmit", and their cognate terms like "sending", "sent", "transferring", "transmitting", "transferred", "transmitted", etc. include sending or transporting content from one unit to another unit, wherein the content may or may not be modified before or after sending, transferring, transmitting.

System Overview

A system and method for context aware privacy protection, in accordance with the present disclosure, is described.

In general, context aware privacy protection mechanism, in accordance with example embodiments of the present disclosure, facilitate protecting user's device. Context aware privacy protection protects user from threat present in his environment/surrounding. Further, protecting the user's device may change a state/status of said device such as by shutting down of device etc.

FIG. 1 illustrates a general view of the system architecture for achieving context aware privacy protection.

As shown in FIG. 1, the system 100 comprises a detector unit 102 for identifying the viewers in user's environment/surrounding; a recommendation unit 106 for notifying user about his environment/surrounding and related threats (if present) and a processing unit 104 for generating a response based on the current environment/surrounding of the user/user device. The system 100 may be adapted to operate completely or partially on a computing device or a server.

The detector unit 102 of the system 100 is adapted to capture data from the environment/surrounding in order to ascertain or assess context. The data may include but not limit to an image or any biometric feature of a person by which presence of a threat may be determined. The detected data is stored within a memory that either resides at a central server level or is present internally in the system 100 itself. The disclosure encompasses that the detector unit 102 periodically screens the environment/surrounding of the user for the above mentioned data. The period limit of detection may be fixed by either the system 100 or the user at the time of configuration or is dynamically updated at any time in future.

The detector unit 102 is further connected to a recommendation unit 106 which receives and processes the detected data from the detector unit 102. It further comprises a storage unit 108 for storing the environment/surrounding data received from the detector unit 102. The recommendation unit 106, that is configured to trigger a security action based on captured data, is coupled to a processing unit 104, wherein the recommendation unit 106 comprises a trigger unit 110 that processes the environment/surrounding data to generate a request which is shared with the processing unit 104 and an alert unit 112 that notifies the user depending upon the response received from the processing unit 104.

The processing unit 104 is a decision engine that consists of various rules and strategies to make decisions according to a variety of situations or environment/surrounding. Said processing unit 104 comprises typically of two sets of rules namely predefined rules and context aware rules. The predefined rules are defined by the user according to his requirements, for example, any application that carries sensitive data may be added to the list of secured applications so that every time the user accesses said listed application, the context aware privacy protection mechanism is initiated by the recommendation unit 106 along with the processing unit 104. Similarly, the context aware rules are learning algorithms to create rules based on user's environment/place/surrounding's behaviour, historical data etc. The rules used by the processing unit 104 may be pre-configured or updated in the system 100.

In an embodiment of present disclosure, more than one rule is applied to the detected data. These rules may be applied either from the set of pre-defined rules, context aware rules or a combination thereof. For instance, if a user is present in a market, then according to the detected data, processing unit 104 will analyse its two sets of rules. It may be possible that two rules are to be applied, where, one rule from the set of predefined rules says to stay away from the detected threat/person/intruder; another rule from the set of context aware rules says to shut down the device; then in such cases, a combination of both the rules is applied.

Periodical or dynamic updating of the rules is also encompassed by the present disclosure. The rules are sensitive and vary for different situations. For instance, presence of person near the computing device does not confirm the presence of threat, as it may be possible that the same person is uninterested in user's computing device and hence, not peeking into the device. In such cases, a specific rule set may be attracted, in response to which an appropriate notification may be processed to inform absence of threat, in spite of the system 100 having detected presence of a person near the device.

Additionally and optionally, the rules present in processing unit 104 may be weighted i.e. each rule is assigned a specific weight according to its nature, situation of detected data, etc. Rule having more weightage will carry more importance in choosing the rules to be applied. For instance, consider a situation where the user is present in a mall, where, according to the detected data, two rules have to be applied such that the decided rules are contradictory to each other, for example, one rule says to continue the access to computing device whereas, on the contrary, other rule says to shut down the device. In such instances, the processing unit 104 will check the weightage of the rules and consequently, rule having more weightage will be considered and a response is prepared accordingly.

The present disclosure encompasses that the processing unit 104 calculates a threshold value depending upon different situations. For example, different threshold values may be calculated for different geographies. Thus, processing unit 104 may be considered as self-learning module. It may also use heat maps to check the human density in surrounding to decide a threshold value. Said heat map consists of value for individual parameter in a graphical manner. This provides intelligent sensing of the surrounding using various data points and recommends user to access or not the sensitive information.

For example, for any densely populated city, threshold may be high but for a small town or village, it may be low. So the calculation of threshold is dynamic and depends either on user or the system 100.

In another example, threshold value for a metro station may be higher than that of a cab. This is so because a metro station usually contains hundreds of people, thus making the place more vulnerable to the threats whereas, a cab typically contains one or more people which makes it less vulnerable. In such scenarios, user can decide whether his device needs to be protected or not.

The processing unit 104 further comprises of an analytics unit 114 which is adapted to analyse the detected data against all the rules present therein and then selecting appropriate rules to be applied on said data. Said analytics unit 114 is further connected to a response generating unit 116. The response generating unit 116 generates a response according to said selected rules where said response typically conveys presence or absence of a threat or breach situation. Said response is shared with the alert unit 112 of the recommendation unit 106 via the trigger unit 110. The alert unit 112 is adapted to trigger at least one security action based on the response generated by the processing unit 104, i.e. based on the presence or absence of the threat/breach or any undesired surroundings.

The present disclosure also encompasses a feature of recommending user whether the place is safe to access the sensitive information or not. Such a determination is made using historical data of the user/system 100.

The present disclosure encompasses that the system 100 provides a user with an option of selecting the applications or functionalities or features of his device on which the privacy mechanism will be applied, for example the privacy mechanism of the present disclosure may be differentially activated for emails, Facebook and messaging applications and may be deactivated for news applications, images, recordings, etc.

The present disclosure also encompasses that the system 100 is capable of providing recommendations to the user relating to the data protection i.e. the system 100 can suggest which data/application stored in the computing device requires more security and which data/application requires less security. However, it is totally dependent on the user to select which data/application among the stored data/applications in the device needs to be protected.

Thus, the system 100 provides a robust solution by adding the value to self-confidence of device owner in using the device more generously in an unsafe environment by making privacy/security measures more vigorous based on silent context aware privacy protection authentication application.

Method Overview

Figure 2:
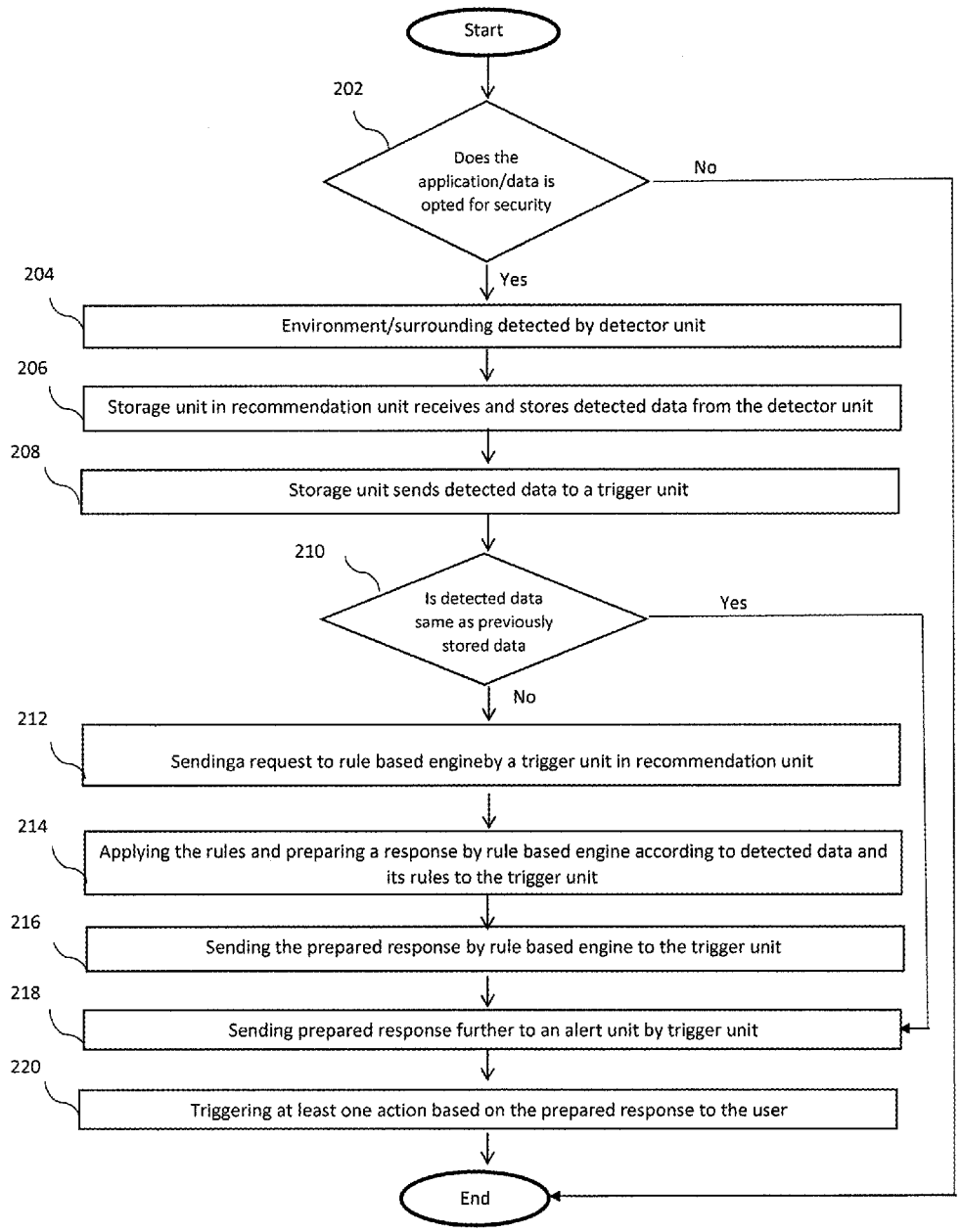
FIG. 2 illustrates a process of providing context aware privacy protection to a computing device.

FIG. 2 describes a high level step by step context aware privacy protection mechanism with the flow of action performed in the whole process. FIG. 2 describes the process of providing context aware privacy protection to a computing device, when a user interacts with computing device to access an application/data and perform activities.

Step 202 includes checking status of the data/application which the user is currently accessing/using or begins to access/use on the computing device, wherein checking determines whether or not said data/application has been opted for context aware privacy protection. In the event, the application has been opted for protection the method leads to step 204. On the contrary, if the data/application is not opted for security, the process of providing privacy/security halts and comes to end. User may continue using the device even if the system 100 has stopped its working for providing privacy/security.

Step 204 includes detecting user's environment/surrounding and capturing detected data. Detector unit 102 detects data from the environment/surrounding of the computing device. For instance, a microphone detects voice of persons nearby, a camera captures one or more photos/images of people present in the environment/surrounding, a biometric sensor identifies eye position of the person peeking into the device, etc. Detected data from different sensors and detecting means like camera, microphones, etc. is then collated followed by pre-processing of the collated data. Pre-processing of data may include but not limit to converting the data into a standard format that is compatible for use by other units present in the system 100. Standardized data may be in the form of packets, bits, messages, or any other communication element.

Further, the collated data is sent to a storage unit 108, present in a recommendation unit 106. Transfer or transmission or sending of pre-processed collated detected data includes transfer or transmission of packets, messages, bits, or any other communication element.

Step 206 includes receiving of the pre-processed collated detected data by storage unit 108 present in a recommendation unit 106. Said storage unit 108 stores said data for future use. Accordingly, the storage unit 108 consists of previously detected data and the currently detected data. The time limit for storing the data in a storage unit 108, may be defined by system 100 or pre-defined by the user as said system 100 provides the user with a feature to set a time limit for storing said data.

Step 208 includes receiving of detected data from storage unit 108 by the trigger unit 110 of the recommendation unit 106. Step 210 includes comparing of current detected data with the previous detected data stored in the storage unit 108 by the trigger unit 110. Comparison of data may include but not limit to comparing of current data with the immediate previous data present in storage unit 108, or comparing of current data with all the previous detected data stored in storage unit 108 or a combination thereof. The comparison result may include but not limit to "yes" or "no". Presence of similar data leads the method to step 218. On the contrary, absence of similar data leads the method to step 212.

Step 212 includes sending a request from trigger unit 110 to a processing unit 104 based on the comparison result. Before sending the request, trigger unit 110 assigns an identifier to said request. It requests the processing unit 104 to provide a response relating to the detected data and a set of rules and decisions present in the processing unit 104. Said request may consist of but not limit to current detected data, a request identifier, etc. Response provided by processing unit 104 has been explained in step 216.

Step 214 includes checking, by processing unit 104, which of the rules stored therein apply to the request received from the trigger unit 110 and subsequently preparing a response according to the selected rules. A response may include but not limit to the advice and suggestions regarding the safety of device indicating whether the device is safe to use or not in a particular situation.

In one embodiment of the present disclosure, if the processing unit 104 does not find any rule associated with a particular detected data, then the processing unit 104 will create and provide a default rule accordingly.

Step 216 includes sending of said prepared response by processing unit 104 to trigger unit 110, present in the recommendation unit 106.

Step 218 includes sending said prepared response further to an alert unit 112 present in recommendation unit 106 by the trigger unit 110.

Step 220 includes triggering of at least one security action based on the response generated by the processing unit 104 to the user, wherein said action protects the privacy of the computing device and helps in countering breach.

In one embodiment of present disclosure, response sent by processing unit 104 is positive where a positive response indicates the presence of any threat available. In such cases, an action, triggered by alert unit 112 may include providing an alert/notification to user indicating vulnerable place, directly hiding the application/data, switching off the computing device, informing an emergency contact, where informing an emergency contact may include but not limit to sending a text message, audio message, video message, e-mailing to an emergency contact where, said emergency contact may be pre-defined either by user or system 100.

The present disclosure encompasses that said action may include but not limit to information relating to threat such as number of persons peeping into the device, number of CCTV camera present in the room, etc.

The present disclosure also encompasses that the user has an option to either accept the notification or ignore it. By accepting the notification, user can allow the system 100 to perform a security action such as hiding his data, shut down his device directly or simply closing down the application. On the contrary, user can also ignore the notification and continues to access his device.

The present disclosure also encompasses that the system 100 allows user to cancel notifications for a specific period of time, i.e. user can presently close the notification window for some time and set a time limit after which same notification may reappear. For instance, a user, currently sending an e-mail to another person suddenly receives a notification indicating threat to privacy/security to device. The user may ignore the notification for 2 minutes and continue his work. This makes the system 100 to send same notification again after 2 minutes.

In another embodiment of present disclosure, response sent by processing unit 104 is negative where a negative response indicates absence of any threat present in environment/surrounding. In such cases, an action, triggered by alert unit 112 may include not sending any type of notification.

In another embodiment of the present disclosure, user has feature of shutting down of entire system 100 for a specific type of data/application. Also, system 100 provides notification relating to increasing number of threats even if the user has shut down the system 100 for that specific data/application for some specific period of time.

Further, the present system 100 also encompasses that the system 100 contains log history of all the notifications. Furthermore, user can also modify the settings of log history to view one or more of the duration, sequence of the notifications, etc.

Although the present disclosure has been described in considerable detail with reference to certain preferred embodiments and examples thereof, other embodiments and equivalents are possible. Even though numerous characteristics and advantages of the present disclosure have been set forth in the foregoing description, together with functional and procedural details, the disclosure is illustrative only, and changes may be made in detail. Thus various modifications are possible of the presently disclosed system and process without deviating from the intended scope and spirit of the present disclosure.

We claim:

1. A method for protecting the privacy of a computing device, the method comprising:
    detecting, by a detector unit, a context-based data from a surrounding of the computing device, wherein the context-based data is capable of providing information relating to context of the surrounding and presence of any threats to the privacy of the computing device;
    receiving the context-based data at a recommender, wherein, said context-based data is processed to generate a request based on occurrence of at least one event;
    receiving the request at the processing unit and generating a response to the request based on the context-based data and a combination of at least two rules,
    wherein each of the at least two rules is assigned a weight and is dynamically created and selected by the processing unit from a plurality of rules based on the context based data and the weight, and wherein the plurality of rules includes at least one contradictory rule; and
    receiving said response at the recommender and triggering at least one action based on said response,
    wherein said at least one action protects the privacy of the computing device as well as of sensitive data stored on the computing device.

2. The method of claim 1, wherein processing the context-based data further comprises comparing said context-based data with a preconfigured context-based data.

3. The method of claim 1, wherein triggering said action comprises, subject to acceptance by a user of the computing device, one of displaying an alert on the computing device, shutting down the computing device, hiding the contents displayed on the computing device, sending a notification and a combination thereof.

4. The method of claim 1, further comprising storing the context-based data detected by the detector unit.

5. The method of claim 1, wherein said rules may be one of pre-defined rules, user defined rules, context-aware rules and a combination thereof.

6. The method of claim 1 further adapted to operate completely or in parts at a device level, a server level and a combination thereof.

7. A system for protecting the privacy of a computing device, the system comprising:
    a detector unit for detecting a context-based data from a surrounding of the computing device, wherein the context-based data is capable of providing information relating to context of the surrounding and presence of any threats to the privacy of the computing device;
    a recommender connected to the detector unit for receiving and processing the context-based data to generate a request based on occurrence of at least one event; and
    a processing unit connected to the recommendation unit for generating a response to said request based on the context-based data and a combination of at least two rules, wherein
    each of the at least two rules is assigned a weight and is dynamically created and selected by the processing unit from a plurality of rules based on the context based data and the weight, and
    wherein, the plurality of rules includes at least one contradictory rule;
    wherein the recommender triggers at least one action based on said response, and
    wherein said at least one action protects the privacy of the computing device as well as of sensitive data stored on the computing device.

8. The system of claim 7, wherein the recommender comprises a storage unit for storing the context-based data detected by the detector unit; and
    a processing unit for processing the context-based data to generate the request.

9. The system of claim 7, wherein the recommender further comprises an alert unit for triggering at least one action based on the response generated by the processor.

* * * * *